US012560274B2

(12) United States Patent     (10) Patent No.:   US 12,560,274 B2

Hooghart et al.     (45) Date of Patent:    Feb. 24, 2026

(54) ADJUSTABLE LEVELLING PAD

(71) Applicant: AKTIEBOLAGET SKF, Gothenburg (SE)

(72) Inventors: Abraham Hendrik Hooghart, Ridderkerk (NL); Rene Vermeulen, Spijkenisse (NL)

(73) Assignee: AKTIEBOLAGET SKF, Gothenburg (SE)

( * ) Notice: Subject to any disclaimer, the term of this patent is extended or adjusted under 35 U.S.C. 154(b) by 211 days.

(21) Appl. No.: 17/582,260

(22) Filed: Jan. 24, 2022

(65) Prior Publication Data

US 2022/0240675 A1     Aug. 4, 2022

(30) Foreign Application Priority Data

Jan. 29, 2021    (DE) .......................... 102021102114.6

(51) Int. Cl.
     F16M 7/00         (2006.01)

(52) U.S. Cl.
     CPC ..................................... F16M 7/00 (2013.01)

(58) Field of Classification Search
     CPC .......... F16M 7/00; F16M 5/00; B23Q 1/0054;
                              A47B 91/022
     USPC .................. 248/637, 677, 678, 679; 411/535
     See application file for complete search history.

(56) References Cited

U.S. PATENT DOCUMENTS

| | | | |
|---|---|---|---|
| 3,144,066 A | 8/1964 | Hecke | |
| 3,879,071 A * | 4/1975 | Gockler | ................ F16L 15/008 |
| | | | 285/347 |

| | | | | |
|---|---|---|---|---|
| 4,061,298 A * | 12/1977 | Kober | ...................... | F16M 7/00 |
| | | | | 248/188.4 |
| 5,340,258 A * | 8/1994 | Simon | ................... | F16B 35/005 |
| | | | | 411/339 |
| 6,062,791 A * | 5/2000 | Simon | ................... | F16B 5/0233 |
| | | | | 411/432 |
| 6,068,234 A | 5/2000 | Keus | | |

(Continued)

FOREIGN PATENT DOCUMENTS

| | | | | |
|---|---|---|---|---|
| CN | 109693116 A * | 4/2019 | .......... | B23Q 1/0054 |
| DE | 2304132 A1 | 8/1974 | | |

(Continued)

OTHER PUBLICATIONS

CNC Machining;"Thread Chamfer Start Standard"; Jan. 30, 2012, https://www.practicalmachinist.com/forum/threads/thread-chamfer-start-standard .240302/ (Year: 2012).

(Continued)

*Primary Examiner* — Jonathan Liu
*Assistant Examiner* — Guang H Guan
(74) *Attorney, Agent, or Firm* — J-TEK LAW PLLC; Scott T. Wakeman; Mark A. Ussai

(57)          ABSTRACT

An adjustable levelling pad includes a first component provided with first screw threads, a second component provided with second screw threads cooperating with the first screw threads of the first component and a bearing element having a bearing surface cooperating with the first component. The second component has an upper surface having an inclined surface portion, the inclined surface portion being inclined in the radial outward direction at an angle relative to an axis perpendicular to the axis of elevation of the adjustable pad.

18 Claims, 7 Drawing Sheets

(56) References Cited

U.S. PATENT DOCUMENTS

| | | | |
|---|---|---|---|
| 6,889,946 B2 * | 5/2005 | Bizaj | F16M 7/00 248/188.4 |
| 7,232,104 B2 * | 6/2007 | Krapels | F16M 7/00 248/677 |
| 7,438,274 B2 | 10/2008 | Vermeulen | |
| 7,717,395 B2 | 5/2010 | Rowan, Jr. et al. | |
| 7,819,375 B1 | 10/2010 | Johansen | |
| 9,285,067 B2 * | 3/2016 | Hooghart | F16B 5/0225 |
| 9,410,657 B2 | 8/2016 | Vogelaar et al. | |
| 9,810,220 B2 | 11/2017 | Ghaisas | |
| D1,004,404 S * | 11/2023 | Hooghart | D15/141 |
| 11,982,401 B2 * | 5/2024 | Vermeulen | B23Q 1/0054 |
| 12,000,533 B2 * | 6/2024 | Vermeulen | F16M 7/00 |
| D1,057,773 S * | 1/2025 | Hooghart | D15/138 |
| D1,058,619 S * | 1/2025 | Hooghart | D15/140 |
| 12,287,063 B2 * | 4/2025 | Vermeulen | F16B 5/0233 |
| 12,398,839 B2 * | 8/2025 | Vermeulen | F16M 5/00 |
| 2022/0240675 A1 | 8/2022 | Hooghart et al. | |
| 2022/0243861 A1 | 8/2022 | Hooghart et al. | |
| 2022/0243862 A1 | 8/2022 | Vermeulen et al. | |
| 2022/0243863 A1 | 8/2022 | Vermeulen et al. | |
| 2023/0011564 A1 * | 1/2023 | Vermeulen | F16M 5/00 |
| 2023/0041643 A1 * | 2/2023 | Vermeulen | F16B 5/0233 |
| 2025/0116366 A1 * | 4/2025 | Greer | F16M 7/00 |

FOREIGN PATENT DOCUMENTS

| | | |
|---|---|---|
| DE | 2344348 A1 | 3/1975 |
| WO | 2004061357 A2 | 7/2004 |
| WO | 2012146266 A1 | 11/2012 |

OTHER PUBLICATIONS

Lecture Notes, Jan. 26, 2015, https://www.practicalmachinist.com/forum/threads/thread-chamfer-start-standard.240302/ (Year:2015).

Marlon Blandon: "Chamfers and countersinks halt burr formation," Cutting Tool Engineering, Oct. 10, 2017, pp. 1-8https://www.ctemag.com/news/articles/chamfers-andcountersinks-halt -burr-formation#.

Written Opinion and Search Report from the Netherlands Patent Office mailed Jun. 2, 2023 in related application No. 2030533, and machine-generated translation thereof.

Fabio Krankel, "Paints and varnishes—Corrosion protection of steel structures by protective paint systems", Part 3—Design considerations, pp. 1-18, ISO 12944, Feb. 8, 2018,https://www.slideshare.net/FbioKrnkel/fbio-krnkel-design-considerations-87458724.

Written Opinion and Search report from the Netherlands Patent Office dispatched May 16, 2023 in related application ho. NL2030528, and translation thereof.

Office Action from the United States Patent Office mailed Sep. 16, 2022 in related U.S. Appl. No. 17/582,254, including examined claims 1-18.

* cited by examiner

ADJUSTABLE LEVELLING PAD

CROSS-REFERENCE

This application claims priority to German patent application no. 10 2021 102 114.6 filed on Jan. 29, 2021, the contents of which are fully incorporated herein by reference.

TECHNOLOGICAL FIELD

The present disclosure is directed to a system configured for use as an adjustable levelling support or pad for connecting a frame of a machine to a support. The disclosure further relates to an assembly comprising a piece of machinery, a support and an adjustable pad, wherein the piece of machinery is mounted to the support by means of the adjustable pad.

BACKGROUND

Adjustable levelling pads are generally configured to provide both support and vertical alignment capability with or without an associated anchor bolt.

Adjustable pads are well known in the art.

Reference can be made to FIGS. 1A and 1B which illustrates a known adjustable levelling pad 10.

The adjustable levelling pad 10 is mounted to connect the frame 1 of a machine to a foundation or support 2, for example constructed from concrete or steel. Anchoring the frame 1 of the machine to the support 2 is here done with an anchor bolt 3.

The adjustable levelling pad 10 comprises a first component 11 or shaft element, a second component 12 or annular element and a third component 13 or bearing element. The first, second and third components 11, 12, 13 are coaxial along a vertical axis Z-Z'.

The first component 11 comprises an upper portion 11a and a lower portion 11b. The lower portion 11b has a cylindrical outer wall provided with an outer screw thread 11c. The upper portion 11a has an outer diameter greater than the outer diameter of the lower portion 11b so as to form an annular flange. As illustrated of FIG. 1B, the upper portion 11a has a partial upper surface 11d of concave shape. The upper surface 11d is rotationally symmetrical.

The first component 11 has a first through-hole 14 for accommodating a shank 3a of the bolt 3.

The second component 12 has a second through-hole with a cylindrical wall 12a provided with an inner screw thread 12b configured to engage with the outer screw thread 11c of the lower portion 11b of the first component 11. The threaded portions 11c, 12b cooperate together and provide a vertical adjustment.

The third component 13 sits between the frame 1 of the machine and the upper portion 11a of the first component 11. As shown in FIG. 1B, the third component 13 has a lower surface 13a engaging with the upper surface 11d of the upper portion 11a of the first component 11. The lower surface 13a has a convex shape and is rotationally symmetrical.

The lower surface 13a and the upper surface 11d are complementarily shaped so as to facilitate slight adjustment of the positions between the first component 11 and the third component 13 relative to one another, for example, in order to accommodate slight deviations between the piece of machinery 1 and the support 2.

The third component 13 has a through hole 16 having a diameter larger than the diameter of the first through-hole 14 in order to allow the shank 3a of the bolt 3 to pass through if an axis of symmetry of the lower surface 11d of the first component 11 is not aligned with an axis of symmetry of the lower surface 13a of the third component 13 in order to accommodate deviations from the horizontal, parallel orientations of the piece of machinery 1 and the support 2.

The adjustable levelling pad 10 is sandwiched between the frame 1 of the machine and the support 2 and securely held in place by the bolt 3 and a nut 4 screwed on a part of the shank 3a extending beyond the piece of machinery 1. The height H of the adjustable levelling pad 10 is adjusted by means of screwing the first component 11 further into or further out of the second component 12.

As shown, the outer surface of the upper portion 11a has a specific profile, here blind holes arranged on the circumference of the outer surface, in order to be gripped by the operator. Such specific profile enables the operator to apply a torque to the first component 11.

Alternatively, the upper portion 11a of the first component 11 may have a polygonal outer circumference (not shown), for example, square or hexagonal, in a plane substantially perpendicular to an axis of the outer screw thread 11c.

Similarly, in order for an operator to apply a torque to the second component 12, the second component has a specific profile, here blind holes arranged on the circumference of the outer surface.

When installed, the adjustable levelling pad 10 is subjected to a mechanical load as a result of the weight of the frame 1 of the machine, and also as a result of reaction forces transmitted by the support 2 and/or by the frame 1 of the machine 1.

The maximum magnitude of the mechanical load carried by the known adjustable levelling pad 10 depends on the strength of the connection between the first component 11 and the second component 12. The maximum mechanical load is determined by the screwed connection between the first and second components 11, 12, which depends on the pitch of inner screw thread 12b and the outer screw thread 11c and on an engaging area over which the inner screw thread 12b and the outer screw thread 11c are engaged.

However, in such known adjustable levelling pads, foreign particles, such as dirt and moisture are able to enter into the threaded joint of the inner and outer screw threads. This is more important when the adjustable pad has not been screwed into its lowest position when it is in use. Indeed, there is then an axial gap between the second component or base part and the first component via which outer particles are able to enter into the threaded joint. This can result in the threaded joint seizing and gripping and not allowing further rotational movement.

Moreover, such adjustable pads are significantly subjected to corrosion.

SUMMARY

An aspect of the present disclosure is to provide an improved adjustable levelling pad in which the entry of outer particles into the threaded joint is counteracted and preferably entirely prevented.

An embodiment of the disclosed adjustable levelling pad includes a first component or shaft element provided with first screw threads; a second component or lower adjustable part having second screw threads cooperating with the first screw threads of the first component; and a bearing element or third component having a bearing surface cooperating with the first component.

The second component comprises an upper surface having at least an inclined or tapered surface, inclined in the radial outward direction at an angle relative to an axis perpendicular to the axis of elevation of the adjustable pad. Such inclined surface improves the protection against corrosion of the adjustable pad. The angle is, for example, bigger or equal to 10°, for example bigger or equal to 15°. For example, the angle is less than 20°.

Advantageously, the second component further comprises an outer cylindrical wall and a rounded surface connecting the inclined surface to the outer cylindrical wall. The radius of curvature of the rounded surface is, for example, greater than 2 mm, for example comprised between 2 mm and 4 mm, for example equal to 3 mm. The combination of such radius of curvature with the inclined surface increases the protection to corrosion of the adjustable pad.

Advantageously, the second component further comprises a substantially planar surface connected to the inclined surface, the radius of curvature connecting the planar surface to the inclined surface being, for example, equal to 6 mm.

In an embodiment, the first component comprises a first portion and a second portion having an outer diameter greater than the outer diameter of the first portion, the first portion being provided with the first screw threads and the protection cap being fastened to the second portion.

In one embodiment, an adjustable leveling pad includes a first component and a second component. The first component has a first portion and a second portion. The first portion of the first component has a first outer diameter and first screw threads, and the second portion of the first component has a second outer diameter greater than the first outer diameter and has a bottom surface. The second component has a through-opening having second screw threads cooperating with the first screw threads of the first component. A bearing element having a bearing surface cooperates with the first component. The second component includes an upper surface having a first part surrounding the through-opening and a second part surrounding the first part. The first part is planar and perpendicular to an axis of elevation of the adjustable levelling pad and has an outer diameter substantially equal to the second outer diameter of the second portion of the first component. The second part surrounds the first part and is inclined in a radial outward direction at an angle relative to an axis perpendicular to the axis of elevation of the adjustable levelling pad. Furthermore, the second part has an outer diameter greater than the outer diameter of the second portion of the first component, and an empty space is defined by the bottom surface of the second portion of the first component and the first part of the upper surface of the second component and the first portion of the first component and an imaginary cylinder bounding the second portion of the first component and extending to the upper surface of the second component.

In an embodiment an air gap is defined by the bottom surface of the second portion of the first component and the first part of the upper surface of the second component and the first portion of the first component and an imaginary cylinder bounding the second portion of the first component and extending to the upper surface of the second component. The bottom surface of the second portion of the first component directly faces the first part of the upper surface of the second component without any structure in the air gap between the bottom surface of the second portion of the first component and the first part of the upper surface of the second component.

In an embodiment, the adjustable pad comprises a protection cap fastened to the first component and extending towards the second component, the protection cap at least partially surrounding the second component and being configured to cooperate in a sealing manner with the second component. As a result, foreign matter may be prevented from gathering in the screw threads of the first and second components.

The phrase "cooperating in a sealing manner" means that the protection cap substantially prevents the infiltration of liquids, particles and dust from the external environment into the threaded joint formed by the first and second screw threads.

In an embodiment, the protection cap may be in radial contact with the outer circumference of the second portion. As an alternative, a radial gap may exist between the protection cap and the outer circumference of the second portion, defining a sealing by narrow passage, or a labyrinth seal.

In an embodiment, the first component is movable relative to the second component between a partially screwed position, in which the threads of the first component partially cooperate with the threads of the second component and a fully screwed position, in which the first component, notably its second portion, axially contacts an upper surface of the second component.

The height of the adjustable levelling pad is thus adjusted by screwing the first component further into or further out of the second component between a minimal total height and a maximal total height. Indeed, by rotating the first component with respect to the second component, the vertical distance bridged by the adjustable pad can be set as desired.

For example, the third component has a convex bearing surface and configured to cooperate with a first concave surface of the first component. In an alternative, the bearing surface of the third component may be concave and configured to cooperate with a first convex surface of the first component.

In a general way, the lower surface of the third component and at least a part of the upper surface of the first component may have complementarily shapes so as to facilitate slight adjustment of the positions between the first component and the bearing element relative to one another, for example, in order to accommodate slight deviations between the piece of machinery and the support.

The radius of curvature of the lower surface of the third component corresponds to the radius of curvature of the upper surface of the first component.

For example, the third component further has a substantially planar upper bearing surface configured to support the frame of the machine. The third component is thus able to move with respect to the first component allowing the inclination of the upper surface to be adjusted with respect to the bottom surface of the frame of the machine, so that flat contact of the lower surface of the second component on the support can be achieved, as well as flat contact of the upper surface of the third component with the bottom surface of the frame of the machine to be supported.

In an embodiment, the first component is movable relative to the second component between a partially screwed position, in which the threads of the first component partially cooperate with the threads of the second component, and a fully screwed position, in which the first component, notably its second portion, axially contacts an upper surface of the second component. The protection cap is configured to slide freely along the outer circumference of the second component when the first component is moved between the partially screwed position and the fully screwed position.

In other words, when the first component rotates relative to the second component, the protection cap slides along the cylindrical outer circumference of the second component.

For example, the protection cap is mounted in an annular groove provided on the circumference of the first component, notably its second portion. The annular groove of the second portion of the first component is, for example, located at the vicinity of its lower end. Alternatively, the annular groove could be provided on the outer wall at a distance of the lower end of the second portion.

For example, the protection cap comprises an annular mounting portion fastened to the first component and an annular protection flange extending towards the second component and radially surrounding in a sealing manner the outer circumference of the second component.

Advantageously, the mounting portion extends axially along an axis substantially parallel to an outer wall of the first component, notably its second portion, and the annular protection flange extends axially along an axis substantially parallel to the outer wall of the second component, the annular protection flange being connected to the annular mounting portion by a connecting portion.

For example, the connecting portion of the protection cap extends along an axis inclined relative to an axis perpendicular to the annular protection flange. For example, the axis of the connecting portion forms an angle comprised between 1° and 10° with the axis perpendicular to the annular protection flange. The annular protection flange may have an outer diameter greater than the outer diameter of the mounting portion and slightly greater than the outer diameter of the second component.

The protection cap may be made of plastic material, for example for example polymeric material, such as polyether ether ketone (PEEK) or any thermoplastic polymer, etc.

In an embodiment, the outer wall of the second component comprises an annular recess receiving the annular protection flange of the protection cap.

The protection cap is thus configured to slide along the of the second component until abutting at the lower end of the recess. The recess forms a height indicator. The annular protection flange may have an inner diameter slightly greater than the outer diameter of the annular recess. The protection cap and the first and second components define an annular closed space.

By "slightly greater", it is meant that the annular protection flange may slide along the outer circumference of the second component when the first and second components are screwed relative to one another, but maintains a radial contact with the circumference in order to form an obstacle to the penetration of foreign particles into the threaded joint.

The annular protection flange of the cap may be flexible so that when the first component is screwed completely into the second component, the flange deforms elastically in order to slide along the outer wall of the second component. The annular protection flange is thus capable, from the material used and/or its dimension, to be deformed under a slight force and to return to its initial position when no force is exerted on the protection flange.

In an embodiment the protection cap is overmolded on the first component or may be mounted from the top once the first component is threaded in the second component.

In an embodiment the adjustable pad comprises a mechanical limiter fastened to the outer circumference of the first component, notably in a recess in the first portion, and configured to abuts axially against a shoulder provided on the inner wall of the second component when the first component is unscrewed from the second component, which avoid the first component to be detached from the second component. The mechanical limiter is, for example, fastened at the lower end of the first component. The mechanical limiter may be annular and mounted in an annular recess.

Alternatively, the pad may comprise two or more mechanical limiters, such as slugs arranged regularly on the circumference of the second portion of the first component.

The outer diameter of the mechanical limiter may be greater than the inner diameter threaded wall of the second component and less than the inner diameter of the shoulder of the second component.

In an embodiment, the adjustable pad comprises an annular sealing element fastened in an annular groove provided on the threaded wall of the second component, for example at the upper end of the second component or at an axial distance from the upper end. The annular sealing element is elastically deformable and configured to elastically deform over the threads between an initial position and a radially compressed position when the first component is mounted in the second component.

The annular sealing element is configured to increase friction with the first component. The inner diameter of the annular sealing element may be slightly less than the outer diameter of the screw threads of the first component, so that the annular sealing element is deformed when the first component is screwed in the second component and is radially compressed against the outer screw threads of the first component, which locks the first component against the second component.

Indeed, when the first component is screwed into the second component, the screw threads of the first component do not cut into the annular sealing element, but the sealing element deforms as it moves over the threads.

The annular sealing element may be, as a non-limiting example, elastically deformable. By "deformable", it is meant that the element is thus capable, from the material used and/or its dimension, to be deformed under a slight force and to return to its initial position when no force is exerted on the element.

In another embodiment, the annular sealing element may be, for example, made of polymeric material, such as nylon or other materials capable of increasing friction on the screw thread.

For example, the annular sealing element acts as a locking element increasing friction between the first and second components. The annular sealing element may be, for example an O-ring.

In an embodiment, the inner wall of the second component may comprise a shoulder provided with an inner screw thread configured to engage with the outer screw thread of the lower portion of the first component. The inner diameter of the shoulder may be less than the inner diameter of the inner wall and greater than the outer diameter of the first portion of the first component. The outer diameter of the outer cylindrical wall of the second component may be greater than the outer diameter of the second portion of the first component.

The outer wall of the second component is provided with an annular recess having an outer diameter advantageously less than the outer diameter of the outer wall.

The adjustable pad is advantageously made in steel, preferably of C45 carbon steel.

According to another aspect, the disclosure further relates to an assembly comprising a piece of machinery, a support and an adjustable pad as described before, wherein the piece of machinery is mounted to the support by means of the adjustable pad.

BRIEF DESCRIPTION OF THE DRAWINGS

The present invention and its advantages will be better understood by studying the detailed description of specific embodiments given by way of non-limiting examples and illustrated by the appended drawings in which.

DETAILED DESCRIPTION

Figure 1A:
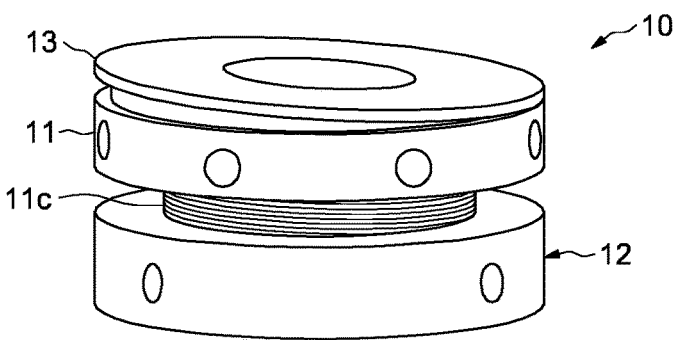
FIG. 1A is a perspective view of a conventional adjustable levelling pad.
Figure 1B:
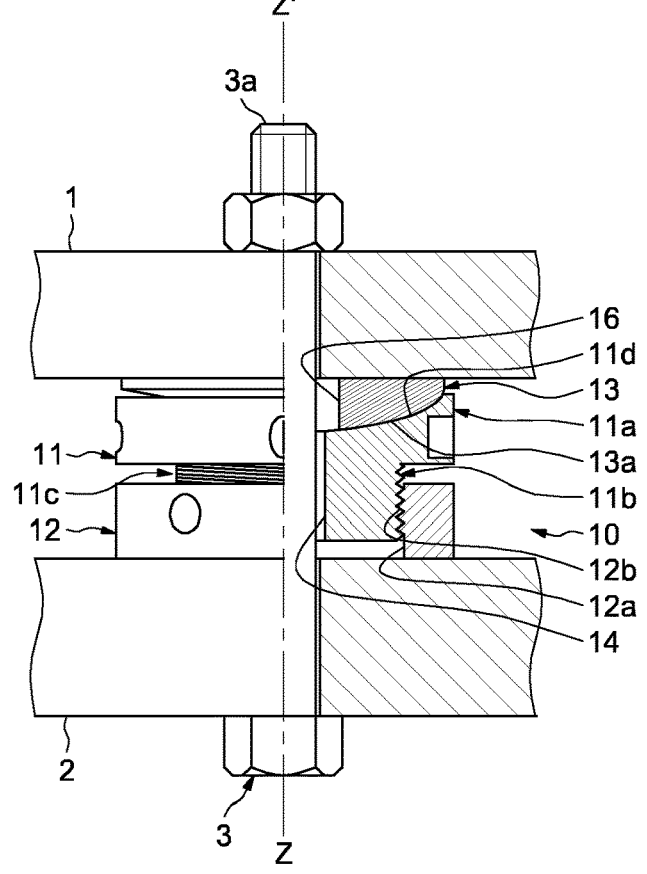
FIG. 1B is a partial cross-section of the adjustable levelling pad of FIG. 1A in operational use.

The expressions "outer" and "inner" refer to the longitudinal axis Z-Z' of the adjustable levelling pad 100, the inner parts being closer to the axis than the outer parts.

The adjustable levelling pad 100 is mounted to connect a frame 1 of a machine to a foundation or support 2, for example constructed from concrete or steel. Anchoring the frame 1 of the machine to the support 2 is here done with an anchor bolt 3.

The adjustable levelling pad 100 comprises a first component 110 or shaft element, a second component 120 or lower adjustable part and a third component 130 or bearing element. The first, second and third components 110, 120, 130 are coaxial along a vertical axis Z-Z'. The adjustable levelling pad 100 is symmetrical relative to the longitudinal axis Z-Z'.

Figure 4:
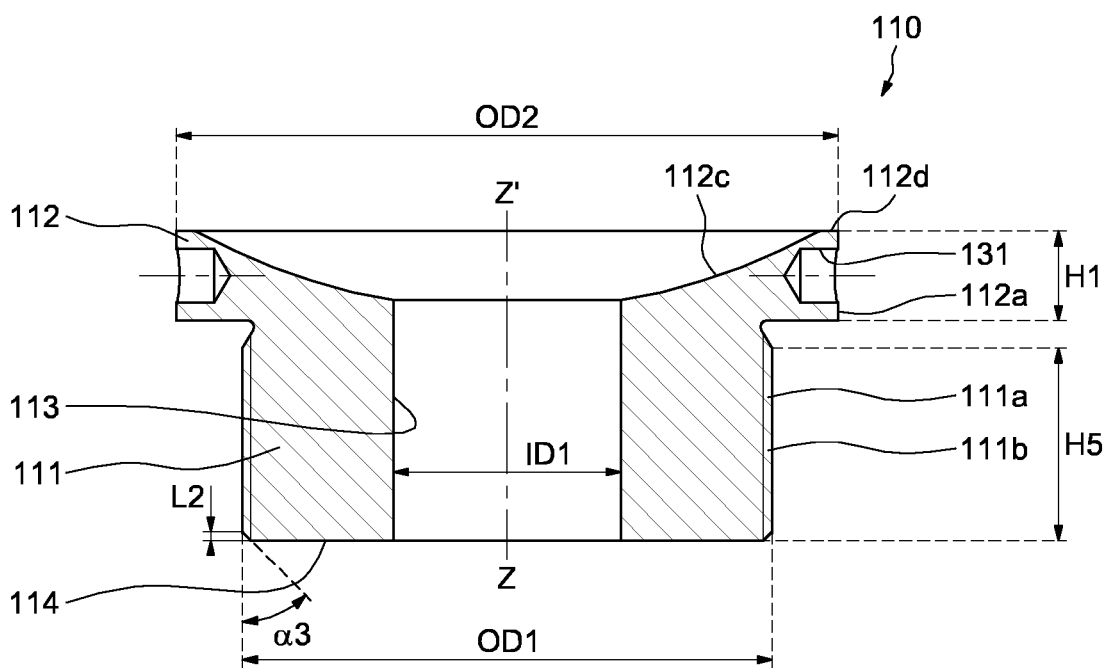
FIG. 4 is a cross-section view of the first component of the adjustable levelling pad of FIGS. 2A and 2B.

The first component 110, shown in details on FIG. 4, comprises a lower portion 111 and an upper portion 112. The lower portion 111 has a cylindrical outer wall 111a provided with an outer screw thread 111b. As illustrated, the outer screw thread 111b has a height H5.

The upper portion 112 has an outer diameter OD2 greater than the outer diameter OD1 of the lower portion 111 so as to form an annular flange. For example, the outer diameter OD2 of the upper portion 112 is 56 mm and 218 mm. The upper portion 112 has a first height H1. For example, the first height H1 of the upper portion 112 is 11 mm and 17 mm. The upper portion 112 has a cylindrical outer wall 112a provided with an annular groove 112b at the vicinity of its lower end.

Alternatively, the annular groove 112b could be provided on the outer wall 112a at a distance from the lower end of the upper portion 112. Alternatively, the upper portion 112 may not comprise the annular groove 112b.

As illustrated of FIG. 4, the upper portion 112 has an upper surface 112c at least partly of upwardly concave shape. The upper surface 112c is rotationally symmetrical. The upper surface 112c is connected to the cylindrical outer wall 112a by a substantially flat surface 112d.

The first component 110 has a first through-hole 113 extending axially from the upper surface 112c to the lower surface 114 of the first component 110. The first through-hole 113 has an inner diameter ID1 configured for accommodating a shank 3a of the bolt 3.

Figure 2A:
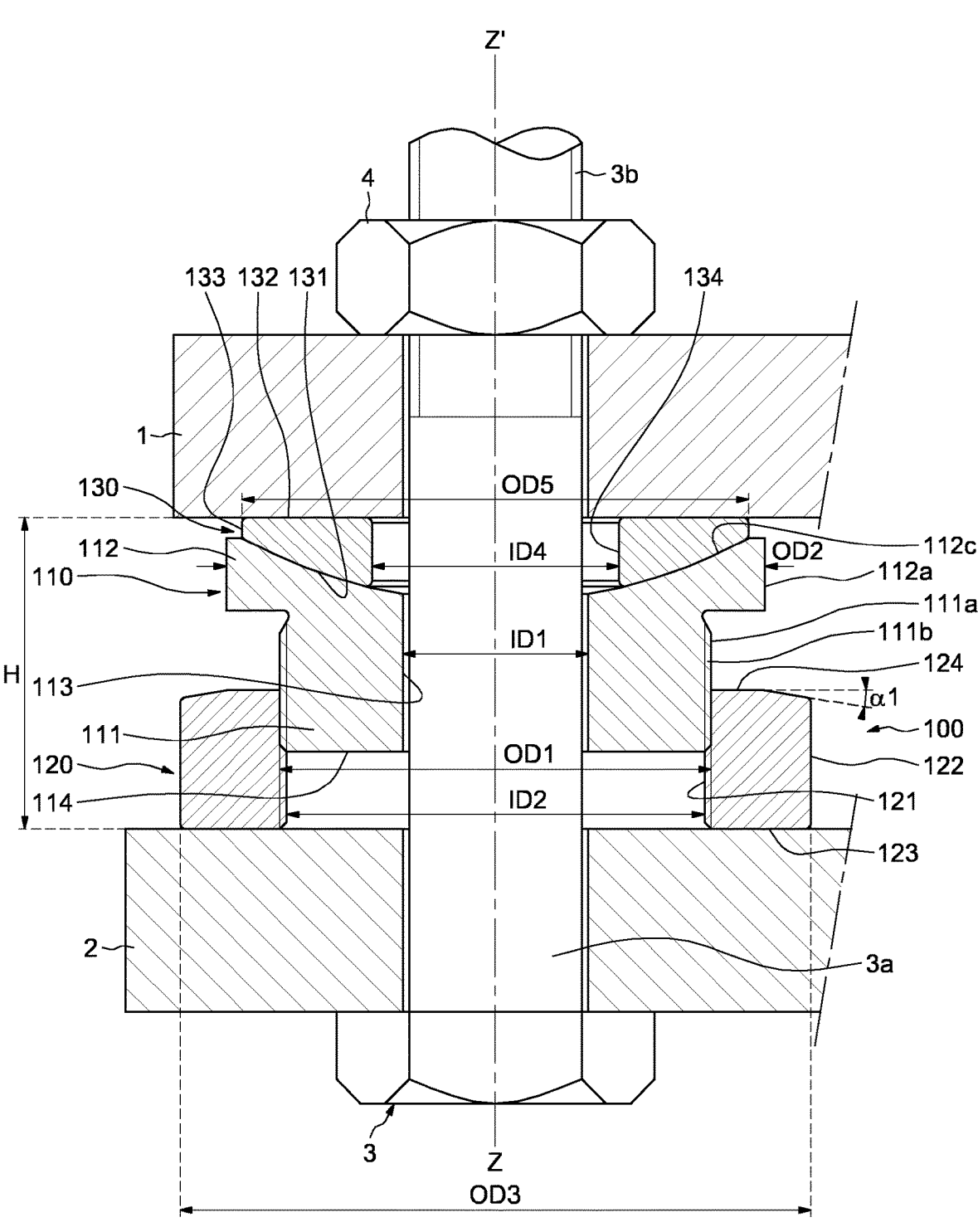
FIGS. 2A and 2B are cross-section views of an adjustable levelling pad according to an embodiment of the invention, in operational use, respectively in a partially screwed position and in a fully screwed position.

As illustrated on FIG. 2A, the bolt 3 comprises shank 3a and a threaded part 3b, for fitted bolts, the shank 3a having a diameter greater than the diameter of the threaded part 3b.

The metric screw thread OD1 of the lower portion 111 of the first component is 42 mm and 190 mm for a bolt size comprised between 12 mm and 64 mm.

The thread start angle α3 of the outer screw threads 111b of the first component 110 is greater than 40°, preferably equal to 45°. Such thread angle may increase the number of threads engaged.

The length L2 of the thread start angle of outer screw threads 111b of the first component 110 is smaller or equal to 1.5 mm.

Figure 3A:
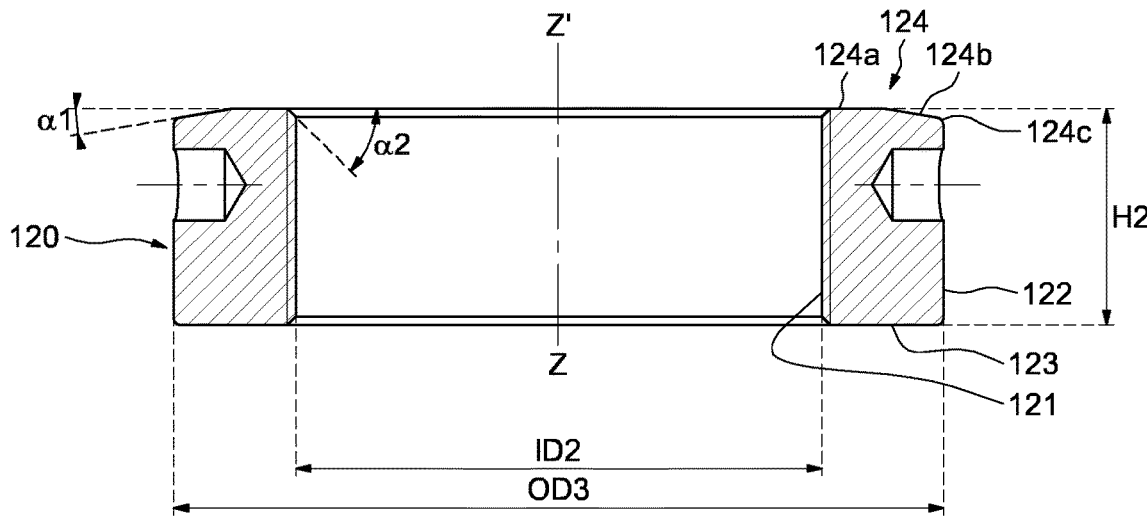
FIG. 3A is a cross-section view of the second component of the adjustable levelling pad of FIGS. 2A and 2B.
Figure 3B:
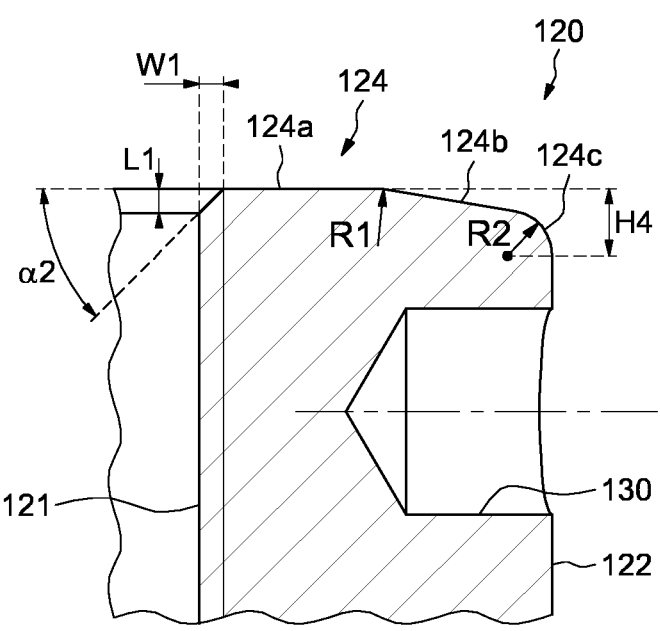
FIG. 3B is a detail view of the second component of FIG. 3A.

The second component 120, shown in details on FIGS. 3A and 3B, is radially delimited by an inner cylindrical wall 121 and an outer cylindrical wall 122 and axially by a lower surface 123 and an upper surface 124.

The inner wall 121 is provided with inner screw threads configured to engage with the outer screw threads 111b of the lower portion 111 of the first component 110. The inner threads 121 have an inner diameter ID2. The threaded portions 111b, 121 cooperate together and provide a vertical adjustment.

The thread entrance angle α2 of the inner screw threads 121 of the second component 120 is less than 35°, preferably equal to 30°. Such thread entrance angle increases the number of threads engaged.

Furthermore, the load path of the load on the third component 130 is transferred to the first component 110 and depends on the thread diameter of the second threads 121 of the second component 120.

The length L1 of the thread entrance angle α2 of the inner screw threads 121 of the second component 120 is less than 1 mm, preferably equal to 0.866 mm and the width W1 is, for example, less than 1.5 mm.

As shown on FIG. 3a, the upper surface 124 of the second component 120 comprises a first planar surface 124a, a second tapered surface 124b and a rounded surface 124c connecting the tapered surface 124b to the outer cylindrical wall 122. The second tapered surface 124b tapers in the radial outward direction at an angle α1 relative to an axis perpendicular to the vertical axis Z-Z' bigger or equal to 10°, for example bigger or equal to 15°.

The radius of curvature R1 connecting the planar surface 124a to the tapered surface 124b is, for example, equal to 6 mm. The radius of curvature R2 of the rounded surface 124c is, for example, greater than 2 mm, for example comprised between 2 mm and 4 mm, for example equal to 3 mm. The center of the radius of curvature R2 is at a distance H4 from the planar surface 124a. The distance H4 is for example equal to 4.5 mm.

The outer diameter OD3 of the outer cylindrical wall 122 of the second component 120 is greater than the outer diameter OD2 of the upper portion 112 of the first component 110. For example, the outer diameter OD3 of the outer cylindrical wall 122 of the second component 120 is 58 mm and 248 mm.

The ratio between the outer diameter OD2 of the upper portion 112 of the first component 110 and the outer diameter OD3 of the second component 120 is between 0.81 and 0.96.

The outer cylindrical wall 122 of the second component 120 has a second height H2. For example, the second height H2 of the second component 120 is between 17 mm and 50 mm.

The first component 110 is movable relative to the second component 120 between a partially screwed position, shown on FIG. 2A, in which the threads 111b of the first component 110 partially cooperate with the threads 121 of the second component 120 and a fully screwed position, not shown, in which the lower surface of the upper portion or flange 112 of the first component 110 axially contacts the upper surface 124 of the second component 120.

Figure 2B:
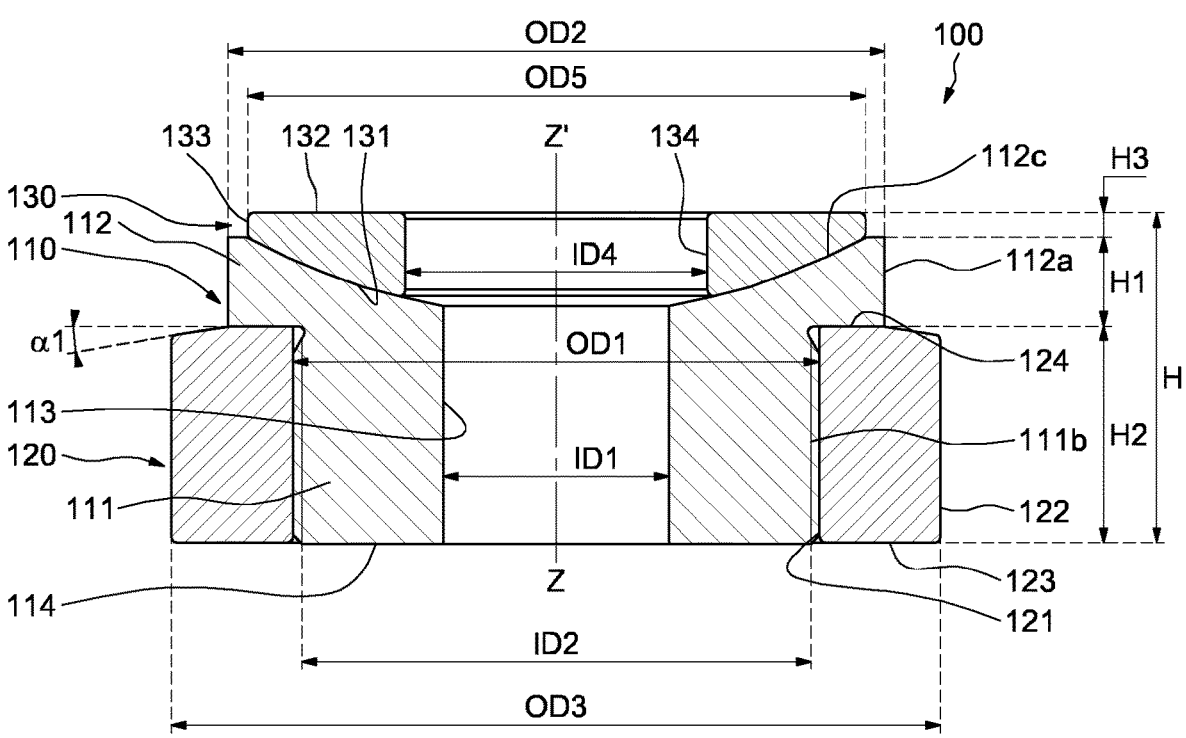

The third component 130 sits between the frame 1 of the machine and the upper portion 112 of the first component 110. As shown in FIGS. 2A and 2B, the third component 130 has a lower surface 131 engaging with the upper surface 112c of the upper portion 112 of the first component 110. The lower surface 131 has a convex shape and is rotationally symmetrical.

The lower surface 131 and the upper surface 112c are complementarily shaped so as to facilitate slight adjustment of the positions between the first component 110 and the third component 130 relative to one another, for example, in order to accommodate slight deviations between the piece of machinery 1 and the support 2. The radius of curvature of the lower surface 131 of the third component 130 corresponds to the radius of curvature of the upper surface 112c of the first component 110.

The third component 130 has further a substantially planar upper bearing surface 132 configured to support the frame 1 of the machine. The third component 130 is thus able to move with respect to the first component 110 allowing the inclination of the upper surface 132 to be adjusted with respect to the bottom surface of the frame 1 of the machine, so that flat contact of the lower surface 123 of the second component 120 on the support 2 can be achieved, as well as flat contact of the upper surface 132 of the third component with the bottom surface of the frame 1 of the machine to be supported.

The third component 130 is radially delimited by an outer cylindrical wall 133 and an inner cylindrical wall 134 forming a third through hole receiving the shank 3a of the bolt 3.

The third through-hole 134 has a diameter ID4 larger than the diameter ID1 of the first through-hole 113 in order to allow the shank 3a of the bolt 3 to pass through if an axis of symmetry of the upper surface 112c of the first component 110 is not aligned with an axis of symmetry of the lower surface 131 of the third component 130 in order to accommodate deviations from horizontal, parallel orientations of the frame 1 of the machine and the support 2.

The outer cylindrical wall 133 of the third component 130 has an outer diameter OD5 greater than the outer diameter OD1 of the lower portion 111 of the first component 110 and less than the outer diameter OD2 of the flange 112 of the first component 110. This provides a relatively wide range of inclinations for adjusting the inclination of the adjustable pad, even when the first component 110 has been completely screwed into the second component 120. The outer diameter OD5 of the third component 130 is 52 mm and 210 mm.

As illustrated, the adjustable levelling pad 100 is sandwiched between the frame 1 of the machine and the support 2 and securely held in place by the bolt 3 and a nut 4 screwed on a part of the shank 3a extending beyond the machine 1.

The height H3 of the third component 130 corresponds to the height of the outer wall 133 extending axially beyond the upper portion 112 of the first component 110.

The height H of the adjustable levelling pad 100 is adjusted between a minimal total height and a maximal total height by means of screwing the first component 110 further into or further out of the second component 120. Indeed, by rotating the first component 110 with respect to the second component 120, the vertical distance bridged by the adjustable pad 100 can be set as desired.

The outer wall 112a of the first component 110 and the outer wall 122 of the second component 120 may each be provided with fastening blind holes or recesses, designed to cooperate with a suitable tool for screwing and unscrewing the first component 110 relative to the second component 120.

The first, second and third components 110, 120, 130 are made, for example, of steel, preferably high-grade steel.

Figure 5A:
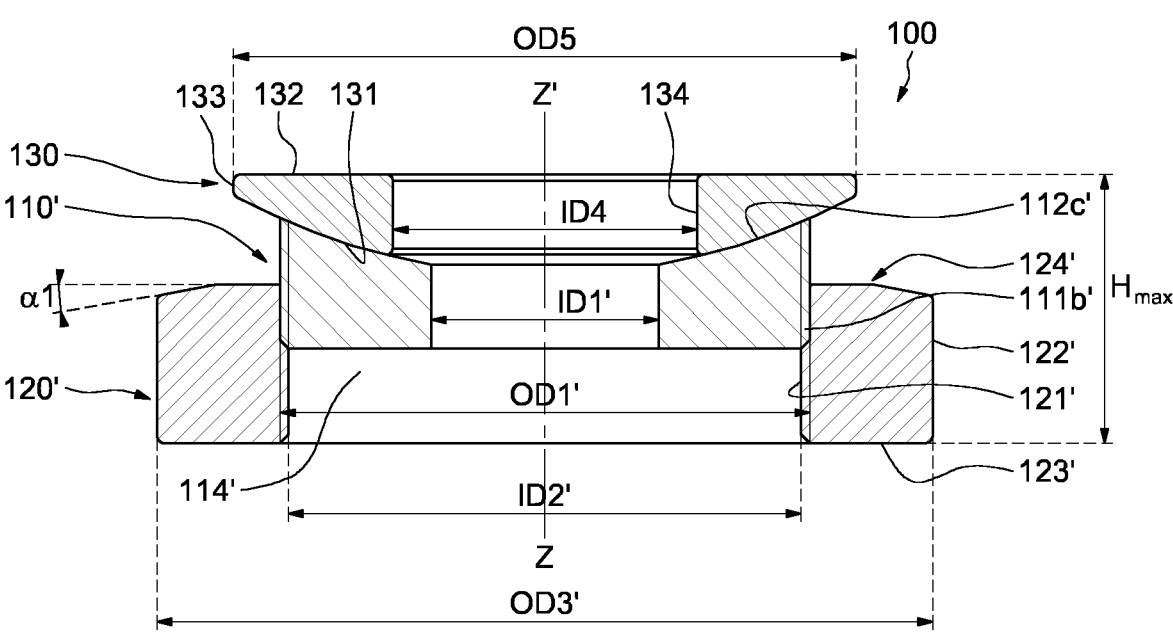
FIGS. 5A and 5B are cross-section views of an adjustable levelling pad according to another embodiment of the invention, in operational use, respectively in a partially screwed position and in a fully screwed position.
Figure 5B:
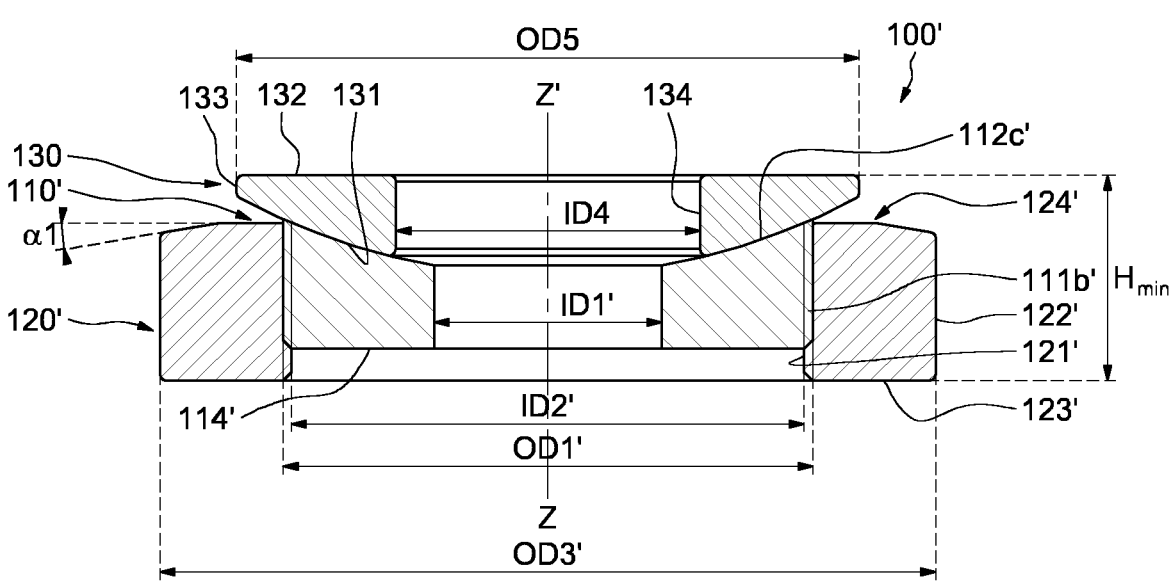

Another embodiment of an adjustable pad shown on FIGS. 5A and 5B, in which the same elements bear the same reference numerals, differs from the adjustable pad of FIGS. 2A and 2B only by the fact that the heights of the first component 110' and of the second component 120', respectively, are reduced compared to the heights of the first component 110 and of the second component 120 shown in FIGS. 2A and 2B, and by the fact that the first component 110' does not comprise an upper portion 112 extending radially beyond the threaded portion 111b'.

As shown on FIGS. 5A and 5B, the outer diameter OD5 of the third component 130 is greater than the outer diameter OD1' of the first component 110'. Furthermore, the adjustment range between the minimal total height Hmin and the maximal total height Hmax is here comprised between 26 mm to 36 mm.

Figure 6:
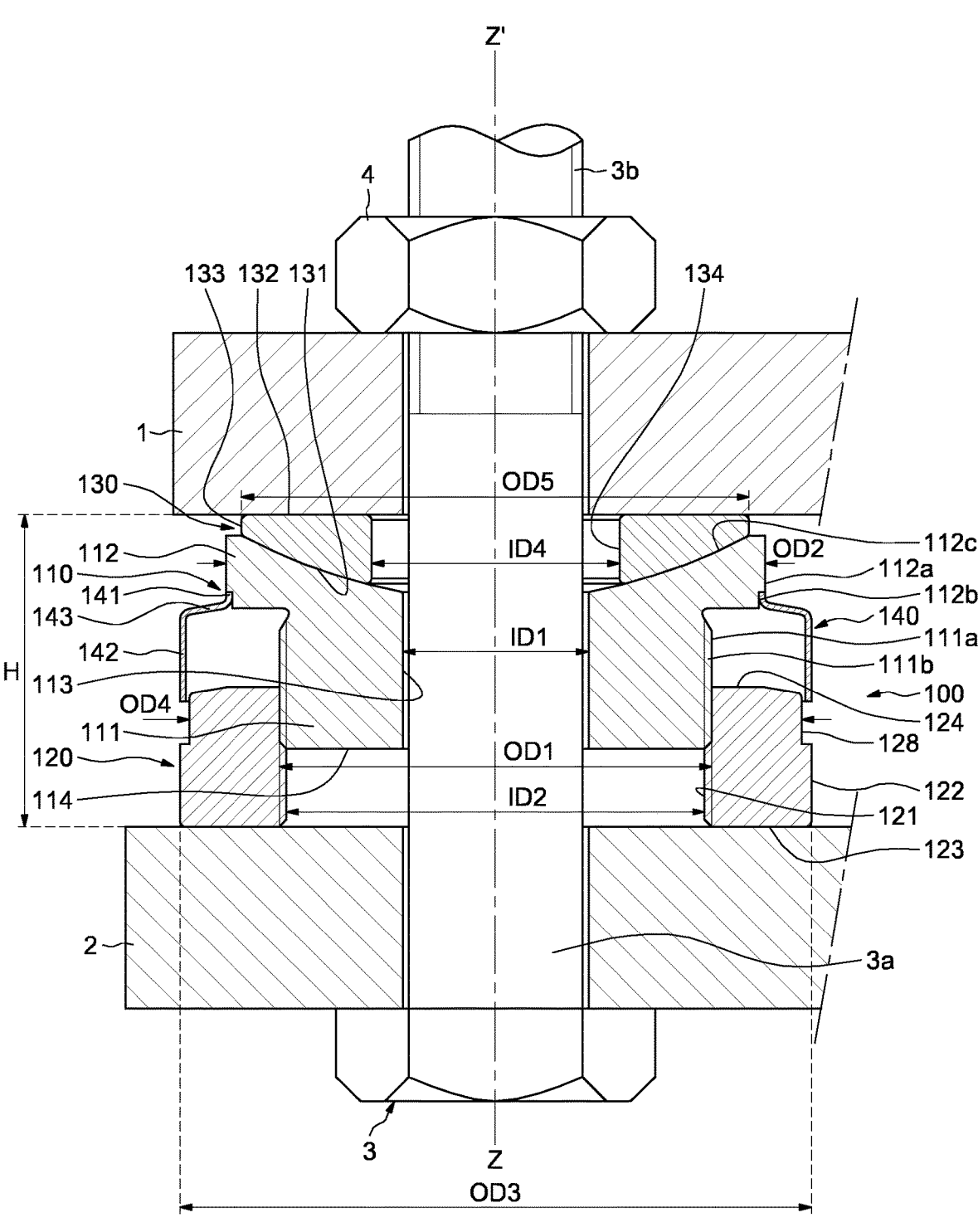
FIG. 6 is a cross-section view of an adjustable levelling pad according to another embodiment of the invention, in operational use.

Another embodiment of an adjustable pad shown in FIG. 6, in which the same elements bear the same reference numerals, differs from the adjustable pad of FIGS. 2A and 2B only by the fact that the adjustable pad 100 further comprises a cylindrical protection cap 140 fastened to the first component 110, notably in an annular groove 112b provided on the circumference of the flange 112 of the first component 110, and extending towards the second component 120. As illustrated, the protection cap 140 surrounds partially the annular recess 128 of the second component 120. Alternatively, the outer wall 122 of the second component 120 may not comprise the annular recess 128. In this case, the protection cap 140 surrounds partially the outer wall 122 of the second component 120.

The protection cap 140 comprises an annular mounting portion 141 fastened in the annular groove 112b of the first component 110 and an annular protection flange 142 designed to surround the outer circumference of the second component 120. The annular protection flange 142 of the protection cap 140 cooperates in a sealing manner with the outer circumference of the second component 120, preventing the infiltration of liquids, particles and dust from the external environment into the threaded joint formed by the first and second screw threads. As illustrated, the annular protection flange 142 is in radial contact with the outer circumference of the second portion 120.

As an alternative, a radial gap may exist between the protection cap 140 and the outer circumference of the second portion 120, defining a sealing by narrow passage, or a labyrinth seal.

The mounting portion 141 extends axially along an axis substantially parallel to the outer wall 112a of the flange 112 of the first component 110. The annular protection flange 142 extends axially along an axis substantially parallel to the outer wall 112a of the flange 112 of the first component 110.

The annular protection flange 142 is connected to the annular mounting portion 141 by a connecting portion 143. The connecting portion 143 extends along an axis inclined relative to an axis perpendicular to the annular protection flange 142. For example, the axis of the connecting portion 143 forms an angle comprised between 1° and 10° with the axis perpendicular to the annular protection flange 142.

The annular protection flange 142 has an outer diameter greater than the outer diameter of the mounting portion 141 and slightly greater than the outer diameter of the second component 120.

The protection cap 140 is made of plastic material, for example for example polymeric material, such as polyether ether ketone (PEEK) or any thermoplastic polymer, etc. The protection cap 140 may be overmolded on the first component 110 or may be mounted from the top once the first component 110 is threaded in the second component 120. Alternatively, the protection cap 140 may be fixed to the first component 110.

When the first component 110 rotates relative to the second component 120, the protection cap 140 slides along the cylindrical outer circumference of the second component 120.

The protection cap 140 is configured to slide along the annular recess 128 of the second component 120 until abutting at the lower end of the recess 128. The recess 128 forms a height indicator.

The annular protection flange 142 has an inner diameter slightly greater than the outer diameter OD4 of the annular recess 128.

The protection cap 140 and the first and second components 110, 120 define an annular closed space.

By "slightly greater", it is meant that the annular protection flange 142 may slide along the outer circumference of the second component 120 when the first and second components are screwed relative to one another, but maintains a radial contact with the circumference in order to form an obstacle to the penetration of foreign particles into the threaded joint.

As a result, foreign matters may be prevented from gathering in the screw threads of the first and second components 110, 120.

The annular protection flange 142 of the cap 140 is flexible so that when the first component 110 is screwed totally in the second component 120, the flange 142 deforms elastically in order to slide along the outer wall 122 of the second component 120. The annular protection flange 142 is thus capable, from the material used and/or its dimension, to be deformed under a slight force when and to return to its initial position when no force is exerted on the protection flange 142.

Figure 7:
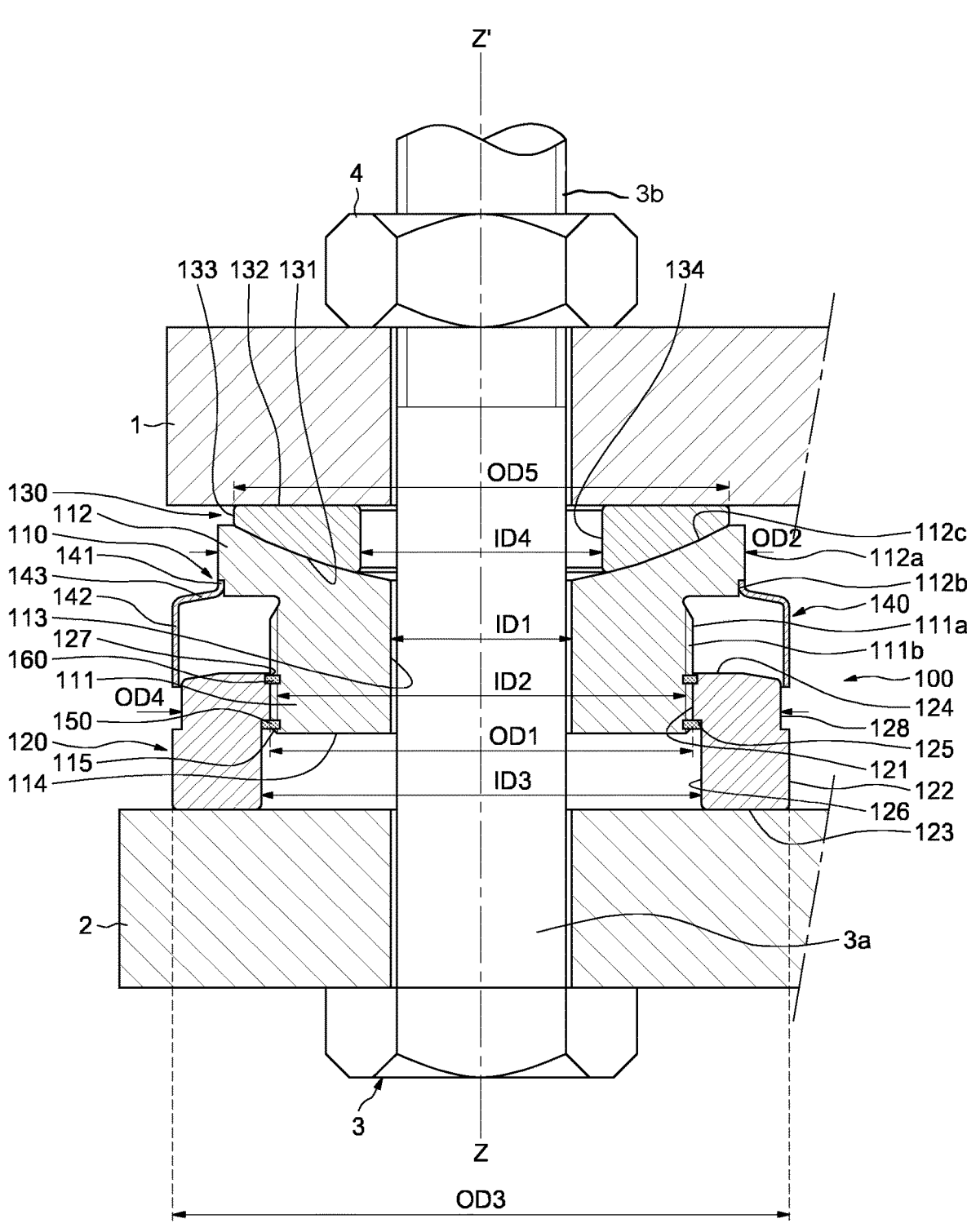
FIG. 7 is a cross-section view of an adjustable levelling pad according to another embodiment of the invention, in operational use.

Another embodiment of an adjustable pad shown on FIG. 7, in which the same elements bear the same reference numerals, differs from the adjustable pad of FIG. 6 only by the fact that the adjustable pad comprises an annular sealing element 160 and a mechanical height limiter 150 and that the inner wall 126 of the second component 120 comprises a shoulder 125 provided with inner threads 121. The inner diameter ID2 of the inner threads 121 is less than the inner diameter ID3 of the inner wall 126.

The annular sealing element 160 is fastened in an annular groove 127 provided on the threaded wall 121 of the second component 120 at the upper end of the second component 120. Alternatively, the annular sealing element 160 may be fastened on the inner threaded wall 121 the second component 120 at an axial distance from the upper end of the second component 120.

This annular sealing element 160 is deformable, for example elastically, between an initial position and a radially compressed position when the first component 110 is mounted in the second component 120.

The annular sealing element 160 is configured to increase friction with the first component 110. The inner diameter of the annular sealing element 160 is slightly less than the outer diameter OD1 of the screw threads 111b of the first component 110, so that the annular sealing element 160 is deformed when screwing the first component 110 in the second component 120 and is radially compressed against the outer screw threads 111b of the first component 110, which locks the first component 110 against the second component 120.

Indeed, when the first component 110 is screwed into the second component 120, the screw threads 111b of the first component 110 do not cut into the annular sealing element 160, but the sealing element 160 deforms as it moves over the threads.

The annular sealing element 160 acts as a locking element increasing friction between the first and second components 110, 120. The annular sealing element 160 is, for example an O-ring. The annular sealing element 160 is for example, made in polymeric material, such as nylon or other materials capable of increasing friction on the screw thread.

The mechanical limiter 150 is fastened to the outer circumference 111a of the upper portion 111 of the first component 110, notably in a recess 115. The mechanical limiter 150 is fastened at the lower end of the first component 110. The mechanical limiter 150 is here annular and mounted in an annular recess 115. Alternatively, the pad 100 may comprises two or more segments of mechanical limiters arranged regularly on the circumference of the upper portion of the first component 110.

The outer diameter of the mechanical limiter 150 is greater than the inner diameter of threaded wall 121 of the second component 120 and less than the inner diameter of the shoulder 125 of the second component 120, so that when the first component 110 is unscrewed from the second component 120, the mechanical limiter 150 is configured to abut axially against the shoulder 125 of the second component 120, which avoids the first component 110 from being detached from the second component 120.

After installation of the first component 110 in the second component 120, the mechanical limiter 150 is mounted from the bottom in the recess 115.

As shown on FIG. 7, the adjustable pad 100 combines the use of a protection cap 140, an annular sealing element 160 and mechanical limiter 150. Alternatively, the adjustable pad 100 may comprise the protection cap 140 and/or the mechanical limiter 150, and/or the sealing element 160.

In all embodiments, the adjustable pad may be made in steel, for example C45 carbon steel.

It should be noted that the adjustable pad has been described with reference to an exemplary embodiment in which the first component is provided with an outer screw thread and a second component provided with an inner screw thread. However, the invention also relates to embodiments in which the outer circumference of the second component is provided with and outer screw thread and the first component comprises an inner screw thread. In such embodiment, the first component may be provided with a flange and the protection cap may be fastened to the flange and extend towards the second component.

Thanks to the invention, ingress of outer particles into the threaded joint is avoided and corrosion resistance of the adjustable pad is increased.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved adjustable leveling pads.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. An adjustable levelling pad comprising:
a first component comprising a first portion and a second portion, the first portion having a first outer diameter and first screw threads and the second portion having a second outer diameter greater than the first outer diameter and a bottom surface;
a second component having a through-opening having second screw threads cooperating with the first screw threads of the first component; and
a bearing element having a bearing surface cooperating with the first component,
wherein the second component comprises an upper surface including a first part surrounding the through-opening and a second part surrounding the first part,
wherein the first component is shiftable between a first position in which the bottom surface of the second portion of the first component directly contacts the first part of the upper surface of the second component and a second position in which the bottom surface of the second portion of the first component is spaced from the first part of the upper surface of the second component in a direction of an axis of elevation of the adjustable levelling pad,
wherein the second part is inclined in a radial outward direction away from the first component at an angle relative to the first part, and
wherein the second part has an outer diameter greater than the second outer diameter of the first component.

2. The adjustable levelling pad according to claim 1, wherein the second part has an inner diameter substantially equal to the second outer diameter of the second portion of the first component.

3. The adjustable levelling pad according to claim 2, wherein the second component further comprises an outer cylindrical wall and a rounded surface connecting the second part of the upper surface of the second component to the outer cylindrical wall.

4. The adjustable levelling pad according to claim 1, wherein the second component is formed as one-piece.

5. An adjustable levelling pad comprising:
a first component comprising a first portion and a second portion, the first portion having a first outer diameter and first screw threads and the second portion having a second outer diameter greater than the first outer diameter and having a bottom surface;
a second component having a through-opening having second screw threads cooperating with the first screw threads of the first component; and
a bearing element having a bearing surface cooperating with the first component,
wherein the second component comprises an upper surface including a first part surrounding the through-opening and a second part surrounding the first part,
wherein the first part is planar and perpendicular to an axis of elevation of the adjustable levelling pad and has an outer diameter substantially equal to the second outer diameter of the second portion of the first component,
wherein the second part surrounds the first part and is inclined in a radial outward direction at an angle relative to an axis perpendicular to the axis of elevation of the adjustable levelling pad,
wherein the second part has an outer diameter greater than the outer diameter of the second portion of the first component,
wherein an air gap is defined by the bottom surface of the second portion of the first component and the first part of the upper surface of the second component and the first portion of the first component and an imaginary cylinder bounding the second portion of the first component and extending to the upper surface of the second component, and
wherein the bottom surface of the second portion of the first component directly faces the first part of the upper surface of the second component without any structure in the air gap between the bottom surface of the second portion of the first component and the first part of the upper surface of the second component.

6. The adjustable levelling pad according to claim 5, wherein the angle is greater or equal to 10°.

7. The adjustable levelling pad according to claim 5, wherein the angle is greater or equal to 15°.

8. The adjustable levelling pad according to claim 5, wherein the second component further comprises an outer cylindrical wall and a rounded surface connecting the second part of the upper surface of the second component to the outer cylindrical wall.

9. The adjustable levelling pad according to claim 8, wherein a radius of curvature of the rounded surface is greater than 2 mm.

10. The adjustable levelling pad according to claim 8, wherein a radius of curvature of the rounded surface is equal to 3 mm.

11. The adjustable levelling pad according to claim 5, wherein a radius of curvature at a junction of the first part and the second part is equal to 6 mm.

12. The adjustable levelling pad according to claim 5, including a protection cap fastened to the first component and extending towards the second component, the protection cap at least partially surrounding the second component and being configured to cooperate in a sealing manner with the second component.

13. The adjustable levelling pad according to claim 5, including a mechanical limiter fastened to an outer circumference of the first component and configured to abut axially against a shoulder provided on an inner wall of the second component when the first component is unscrewed from the second component.

14. The adjustable levelling pad according to claim 5, including an annular sealing element fastened to a wall of the second component having the second screw threads, the annular sealing element being elastically deformable and configured to elastically deform over the first screw threads between an initial position and a radially compressed position when the first component is mounted in the second component.

15. The adjustable levelling pad according to claim 5, wherein the first component has an outer cylindrical wall and the second component has an outer cylindrical wall.

16. The adjustable levelling pad according to claim 5, including:

a protection cap fastened to the first component and extending towards the second component, the protection cap at least partially surrounding the second component and being configured to cooperate in a sealing manner with the second component, and a mechanical limiter fastened to an outer circumference of the first component and configured to abut axially against a shoulder provided on an inner wall of the second component when the first component is unscrewed from the second component.

17. The adjustable levelling pad according to claim 5, wherein the second component is formed as one-piece.

18. An assembly comprising:

a piece of machinery;

a support; and an adjustable levelling pad according to claim 5 located between the piece of machinery and the support with a top surface of the bearing element in contact with the piece of machinery and a bottom surface of the second component in contact with the support.

* * * * *